United States Patent [19]

Kokubu

[11] Patent Number: 4,691,201

[45] Date of Patent: Sep. 1, 1987

[54] ENCODED SIGNAL DEVICE WITH SELF-CONTAINED CLOCK GENERATION

[75] Inventor: Sadao Kokubu, Aichi, Japan

[73] Assignee: Kabushiki Kaisha Tokai Rika Denki Seisakusho, Aichi, Japan

[21] Appl. No.: 881,582

[22] Filed: Jul. 2, 1986

Related U.S. Application Data

[63] Continuation of Ser. No. 679,555, Dec. 7, 1984, abandoned.

[30] Foreign Application Priority Data

Dec. 7, 1983 [JP] Japan ........................ 58-189469[U]
Dec. 22, 1983 [JP] Japan ........................ 58-197469[U]

[51] Int. Cl.⁴ ........................................ H04Q 1/00

[52] U.S. Cl. ..................... 340/825.31; 340/825.34; 361/172

[58] Field of Search .................. 235/382, 382.5, 458; 70/277, 278; 361/172; 365/78; 340/825.56, 825.3, 825.31-825.34; 307/10 AT

[56] References Cited

U.S. PATENT DOCUMENTS

| | | | |
|---|---|---|---|
| 3,688,269 | 8/1972 | Miller | 235/458 X |
| 3,821,704 | 6/1974 | Sabsay | 340/825.31 X |
| 3,889,501 | 6/1975 | Fort | 361/172 X |
| 4,050,063 | 9/1977 | Schull | 235/382 |
| 4,144,523 | 3/1979 | Kaplit | 340/825.31 |
| 4,150,783 | 4/1979 | Litovchenko et al. | 235/458 |
| 4,298,792 | 11/1981 | Granholm et al. | 235/458 X |

*Primary Examiner*—Ulysses Weldon
*Attorney, Agent, or Firm*—Finnegan, Henderson, Farabow, Garrett and Dunner

[57] ABSTRACT

An encoded signal device employing a pulse generating means for generating plural encoded pulse trains. The pulse generating means is encoded so that a logical add signal of the plural pulse trains includes one pulse at each timing position of a pulse generation timing system. The logical add signal is utilized as a synchronizing signal in reading out the plural encoded pulse trains.

14 Claims, 22 Drawing Figures

| | | | | | | | | |
|---|---|---|---|---|---|---|---|---|
| (a) | 000 | 001 | 010 | 011 | 100 | 101 | 110 | 111 |
| (b) | 111 | 110 | 101 | 100 | 011 | 010 | 001 | 000 |
| | | 111 | 111 | 101 | 111 | 011 | 011 | 001 |
| | | | | 110 | | 110 | 101 | 010 |
| | | | | 111 | | 111 | 111 | 011 |
| | | | | | | | | 100 |
| | | | | | | | | 101 |
| | | | | | | | | 110 |
| | | | | | | | | 111 |

FIG. 8(a)
FIG. 8(b)
FIG. 8(c)
FIG. 8(d)
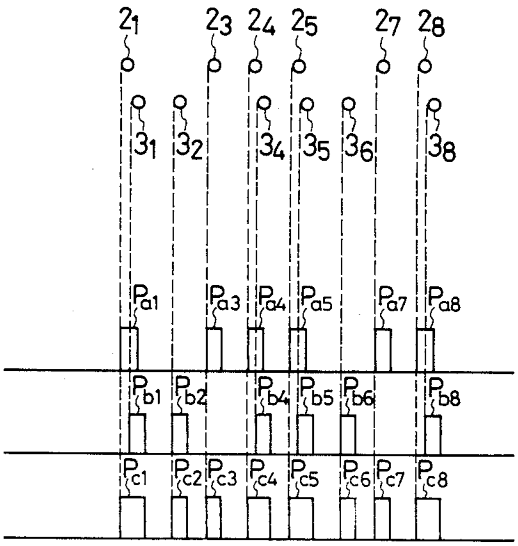
FIG. 9(a)
FIG. 9(b)
FIG. 9(c)
FIG. 9(d)
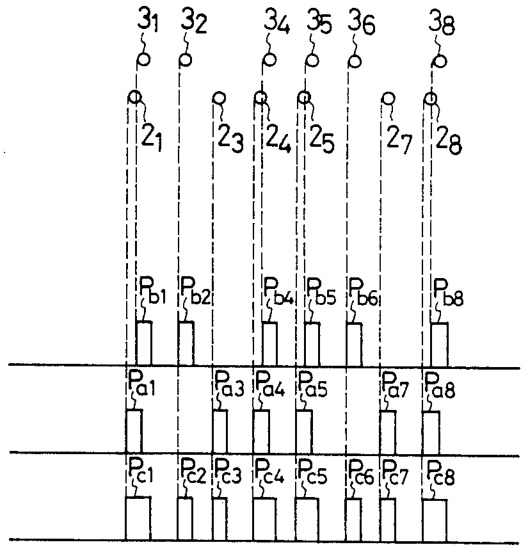

ENCODED SIGNAL DEVICE WITH SELF-CONTAINED CLOCK GENERATION

This application is a continuation, of application Ser. No. 679,555, filed on 12/07/84 now abandoned.

FIELD OF THE INVENTION

This invention relates to an encoded signal device, such as an electronic key, which generates encoded pulse trains in response to an operation member to cause a certain action such as the unlocking of a lock.

BACKGROUND OF THE INVENTION

In the past, an unlocking structure, for example for a car, has been proposed in which a key, functioning as an operation member, has first and second thru-hole rows formed along its longitudinal direction. The first thru-hole row causes the generation of a first encoded pulse train and the second thru-hole row causes the generation of a second encoded pulse train. The first pulse train and the second pulse train are generated when the key is inserted into a key hole having paired light projecting and light receiving elements arranged correspondingly to the first thru-hole row and the second thru-hole row. The second encoded pulse train is read out by treating the generated first pulse train as a synchronizing signal. If the read-out second encoded pulse train agrees with the pre-set encoded signal an unlocking action of a door is performed.

According to the foregoing conventional structure, however, because the first pulse train is employed only as a synchronizing signal, the encoded signal may be obtained only from the second pulse train. Thus, the number of encoded signal pulses is reduced in comparison to the actual number of thru-holes formed in the key.

Further, the unlocking action can not be performed if the first and second thru-hole rows are not alighed with, and read out by, the corresponding first and second readers. That is, the arrangement is inconvenient because the unlocking device does not operate if the key is inserted upside down.

SUMMARY OF THE INVENTION

The present invention has been devised in view of the foregoing circumstances of the prior art, and an object hereof is a novel encoded signal device which can utilize all of the pulses generated by a pulse generating means of an operation member as an encoded signal to increase the number of encoded signal pulses.

It is another object of the present invention to provide an electronic key device which can actually read an encoded signal to provide an output signal when a key is inserted into a key hole whether or not the key is right side up or upside down.

A further object of the present invention is to prevent generation of an erroneous output signal when a key is removed from the key hole.

In brief, in the present invention an operation member is provided with pulse generating means for generating plural pulse trains encoded on the basis of one pulse generation timing system, the pulse generating means is designed so that at least one of the plural pulse trains contains a pulse at each pulse generation timing, and a logical add signal of the plural pulse trains is utilized as a synchronizing signal which is used in reading out the plural pulse trains, whereby the synchronizing signal can be obtained without peculiar means of generating another pulse train therefor.

Further, by differentiating the timing of generation between a first pulse and a second pulse both generated by the pulse generating means, the normal and upside down states and the insertion and removal situations of the key can be discriminated through investigation as to which of a first detector and a second detector for detecting these pulses generated an output first.

BRIEF DESCRIPTION OF THE DRAWINGS

FIG. 3(*a*) through 3(*a*) illustrate the key with thru-hole rows and waveforms generated thereby;

FIG. 7(*b*) is a detailed circuit diagram of the processing circuit of FIG. 7(*a*);

FIG. 7 (*c*), (*d*), and (*e*) are waveform diagrams of signal generated by the circuit of FIG. 7(*b*); and FIG. 8(*a*) through 8(*d*) and 9(*a*) through 9(*d*) are waveform diagrams for explanation of the operation showing thru-hole rows and corresponding signals.

DETAILED DESCRIPTION OF THE PREFERRED EMBODIMENTS

Figure 1:
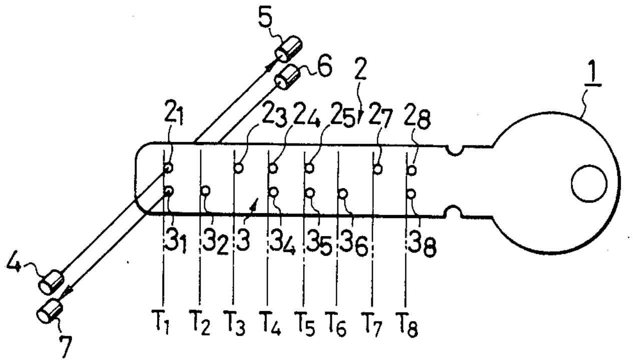
FIG. 1 is a side view of an embodiment of the encoded signal device of the present invention.

FIG. 1 shows an encoded signal device in accordance with the present invention. An operation member 1, for example a key, has formed along its longitudinal direction a first thru-hole row 2 and a second thru-hole row 3 serving as pulse generating means. On the key 1 there are set plural pulse generation timing positions, for example, eight pulse generation timing positions $T_1$, $T_2$, . . . ,$T_8$. As an illustration, the first thru-hole row 2 consists of thru-holes $2_1$, $2_3$, $2_4$, $2_5$, $2_7$ and $2_8$ corresponding to the pulse generation timing positions $T_1$, $T_3$, $T_4$, $T_5$, $T_7$, and $T_8$, and the second thru-hole row 3 consists of thru-holes $3_1$, $3_2$, $3_4$, $3_5$, $3_6$ and $3_8$ corresponding to the pulse generation timing positions $T_1$, $T_2$, $T_4$, $T_5$, $T_6$ and $T_8$ That is, these rows are set so that at least one of the first thru-hole row 2 and the second thru-hole row 3 has a thru-hole at each pulse generation timing position $T_1$, $T_2$, . . . , $T_8$.

A first light projecting element 4 and a first light receiving elements 5 form a first detector pair aligned with the first thru-hole row 2. A second light projecting element 6 and a second light receiving element 7 form a second detector pair aligned with the second thru-hole row 3. The first and second detector pairs are arranged in the vicinity of a key hole inside of a door of a car (not shown).

The second light receiving element 7 is positioned beneath the first light projecting element 4 and the second light projecting element 6 is positioned beneath the first light receiving element 5. The light projecting directions of the first light projecting element 4 and the second light projecting element 6 are mutually opposite.

As the key 1 is inserted into the key hole of the door, the first light receiving element 5 generates a first pulse train $P_a$ (see FIG. 3(*b*)) encoded on the basis of the first thru-hole row 2, whereas the second light receiving element 7 generates a second pulse train $P_b$ (see FIG. 3(*c*)) encoded on the basis of the second thru-hole row 3.

Figure 2:
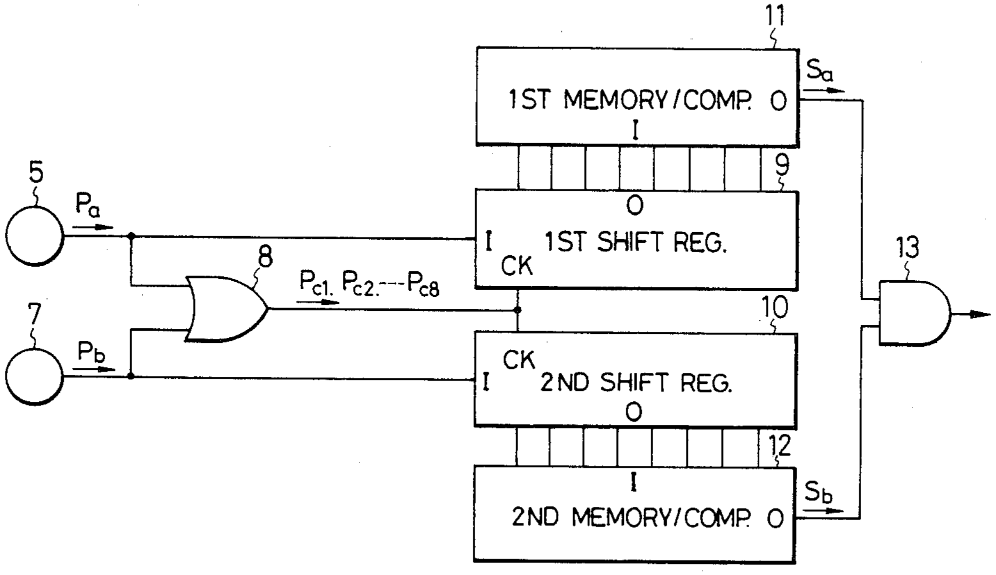
FIG. 2 is a block diagram showing an embodiment of an encoded signal reader used in the present invention.

The structure of an encoded signal reader of the present invention will be described with reference to FIG. 2. The output terminal of the first light receiving element 5 is connected to a first input terminal of an OR circuit 8 and an input terminal I of a first shift register 9. The output terminal of the second light receiving element 7 is connected to a second input terminal of the OR circuit 8 and an input terminal I of a second shift register 10. The output terminal of the OR circuit 8 is connected to respective clock input terminals CK of the shift registers 9 and 10.

Eight-bit output terminals 0 of the first shift register 9 are connected to eight-bit input terminals I of a first memory and comparator circuit 11. Similarly, eight-bit output terminals 0 of the second shift register 10 are connected to eight-bit input terminals I of a second memory and comparator circuit 12.

The first memory and comparator circuit 11 stores a first pre-set encoded signal which is an eight-bit signal "10111011." When the output signal of the first shift register 9 is equal to the first pre-set encoded signal, a coincidence signal $S_a$ having a high level is outputted from the output terminal 0 of the first memory and comparator circuit 11. Similarly, the second memory and comparator circuit 12 stores a second pre-set encoded signal which is an eight-bit signal "11011101." When the output signal of the second shift register 10 is equal to the second pre-set encoded signal, a coincidence signal $S_b$ having a high level is outputted from the output terminal 0 of the second memory and comparator circuit 12.

The output terminals 0 of these memory and comparator circuits 11 and 12 are respectively connected to first and second input terminal of an AND circuit 13. The output terminal of the AND gate circuit 13 is connected to an unlocking mechanisum (not shown) of the car door.

The operation of the embodiment of FIGS. 1 and 2 will be described with reference to FIGS. 3 and 4.

As the key 1 is inserted into the key hole of the door of the car, the first light receiving element 5 generates the first encoded pulse train $P_a$ consisting of pulses $P_{al}$, $P_{a3}$, $P_{a4}$, $P_{a5}$, $P_{a7}$ and $P_{a8}$, as shown in FIG. 3(*b*), on the basis of the first thru-hole row 2 consisting of thru-holes $2_1$, $2_3$, $2_4$, $2_5$, $2_7$ and $2_8$, as shown in FIG. 3(*a*). At the same time, the second light receiving element 7 generates the second encoded pulse train $P_b$ consisting of pulse $P_{bl}$, $P_{b2}$, $P_{b4}$, $P_{b5}$, $P_{b6}$ and $P_{b8}$, as shown in FIG. 3(*c*), on the basis of the second thru-hole row 3 consisting of thru-hole $3_1$, $3_2$, $3_4$, $3_5$, $3_6$ and $3_8$, as shown in FIG. 3(*a*).

The pulse generation timing is the same for the first pulse train $P_a$ and the second pulse train $P_b$ with respect to the pulse generation timing positions $T_1, T_2, \ldots; T_8$, and either or both of the pulse trains $P_a$ and $P_b$ cause the generation of a pulse at each pulse timing position. By applying these pulse trains $P_a$ and $P_b$ to the OR circuit 8, the OR circuit 8 provides the logical add signal, as shown in FIG. 3(*a*), which is the synchronizing signal consisting of synchronizing pulses $P_{cl}, P_{c2}, \ldots, P_{c8}$ which are applied to the clock terminals CK of each of the shift registers 9 and 10.

The first shift register 9 stores signals having values representing the presence or absence of a pulse train $P_a$. Thus, in response to the inputs to the terminal I, the logical signal "1" or "0" is written into each of the storage positions of the shift register 9 on the basis of the synchronizing pulses $P_{cl}, P_{c2}, \ldots, P_{c8}$. Similarly, the second shift register 10 stores signals having values representing the presence or absence of a pulse in the pulse train $P_b$. Thus, in response to inputs to the terminal I the logical signal "1" or "0" is written into each of the storage positions of the shift register 10 on the basis of the synchronizing pulses $P_{cl}, P_{c2}, \ldots, P_{c8}$. Thus, the stored contents of the first shift register 9 become an eight-bit signal "10111011", and the stored contents of the second shift register 10 become an eight-bit signal "11011101".

The output signals of the shift registers 9 and 10 are applied to the corresponding input terminals I of the memory and comparator circuits 11 and 12. The first memory and comparator circuit 11 outputs the coincidence signal $S_a$ because the output signal of the first shift register 9 is equal to the first pre-set encoded signal, i.e., the eight-bit signal "10111011." The second memory and comparator circuit 12 outputs the coincidence signal $S_b$ because the output signal of the second shift register 10 is equal to the second pre-set encoded signal, i.e., the eight-bit signal "11011101."

The coincidence signals $S_a$ and $S_b$ are applied to the AND circuit 13. The AND circuit 13 provides an output signal of a high level, which is applied to an unlocking mechanism (not shown) of a car door. This unlocking mechanism performs an unlocking action of the door by energizing a magnetic solenoid functioning as an actuator.

Figures 3A, 3B, 3C, 3D, 4:
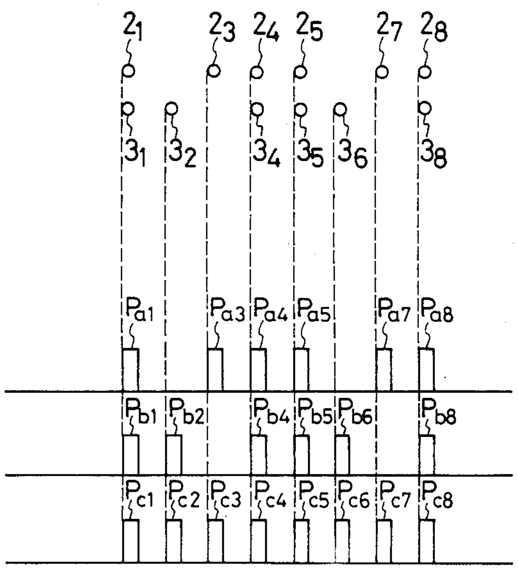
FIG. 4 is a view for explanation of the operation of the present invention, showing the combinations of encoded signal pulses.

FIG. 4 illustrates the combinations of encoded signal pulses in the case of three bits (but, the first embodiment employs eight bits), in which row (a) shows encoded signals assumable by the first pulse trail $P_a$. Row (b) and rows underneath show encoded signals which can be combined with the encoded signals of column (a) and are assumable by the second pulse train $P_b$. Any logical add of the signals is the three-bit signal "111". Letting the number of all cominations shown in FIG. 4 (the number of encoded signals) be "N", then $$N = 1 + (2^1 \times {}_3C_1) + (2^2 \times {}_3C_2) + (2^3 \times {}_3C_3) = 27.$$

In the case of three bits, the conventional system gives the number of encoded signals equal to $2^3=8$, whereas the present invention significantly increases that number to 27. As a natural result, N, the number of encoded signals, in the case of bits, becomes $$N = 1 + (2^1 \times {}_nC_1) + (2^2 \times {}_nC_2) + (2^3 \times {}_nC_3) \ldots + (2^{n-1} \times {}_nC_{n-1})$$

-continued $$+ (2^n \times {}_nC_n).$$

The conventional system gives $(2^n \times {}_nC_n) = 2^n$ for N, thus, the increased number by the present embodiment becomes $$1 + (2^1 \times {}_nC_1) + (2^2 \times {}_nC_2) + (2^3 \times {}_nC_3) \ldots + (2^{n-1} \times {}_nC_{n-1}).$$

As apparent from the foregoing description, according to the first embodiment of the present invention, either or both of the first pulse train $P_a$ and the second pulse train $P_b$ generates the pulse at each pulse generation timing without exception. Thus, the logical add signal of these pulse trains $P_a$ and $P_b$ can be utilized as the synchronizing signal consisting of $P_{cl}, P_{c2}, \ldots, P_{c8}$. Accordingly, a separate thru-hole row for the synchronizing signal is not needed to be formed in the key 1. On the contrary, both the first pulse train $P_a$ and the second pulse train $P_b$ can be utilized as the encoded signals. As a result, the number of encoded signals can be increased significantly and the security of the key is correspondingly enhanced.

Further, in the first embodiment, the light projecting element 4 for the first thru-hole row 2 and the light projecting element 6 for the second thru-hole row 3 of the key 1 are opposite in light projecting direction. Thus, each of the light receiving elements 5 and 7 receives the light emitted only from the corresponding light projecting element 4 or 6 and the light receiving element 5 and 7 do not cause a malfunction.

The encoded signal device described hereinabove according to the first embodiment of the present invention creates the synchronizing signal without providing specifically a pulse generating means for generation of a pulse train for the synchronizing signal on the operation member. This produces the practical effect that all of the pulses generated by the pulse generating means on the operation member can be utilized as the encoded signal pulses and the number of encoded signals can be increased.

A second embodiment of the present invention will be described with reference to FIGS. 5, 6, and 7(*a*) in which elements corresponding to those shown in FIGS. 1 and 2 bear the same reference numbers.

Figure 5:
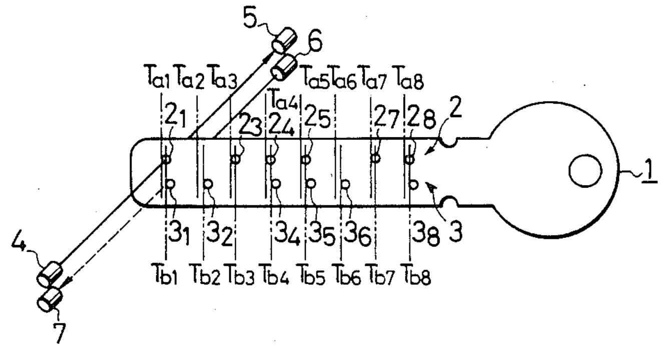
FIGS. 5 and 6 are side views showing the normal position and the upside down position of a key.

In FIG. 5, plural pulse generation timing positions, for example, eight pulse generation timing positions $T_{al}, T_{a2}, \ldots, T_{a8}$ are set on the key 1 along its longitudinal direction. The first thru-hole row 2 consists of, for example, circular thru-holes $2_1$, $2_3$, $2_4$, $2_5$, $2_7$ and $2_8$ corresponding to the pulse generation timing positions $T_{al}$, $T_{a3}$, $T_{a4}$, $T_{a5}$, $T_{a7}$ and $T_{a8}$.

There is also provided on the key 1 along its longitudinal direction, plural pulse generation timing positions, for example, eight pulse generation timing positions $T_{b1}, T_{b2}, \ldots, T_{b8}$ which are displaced a distance corresponding to the radius of a thru-hole of the first thru-hole row 2 with respect to the foregoing pulse generation timing positions $T_{al}, T_{a2}, \ldots, T_{a8}$. The second thru-hole row 3 consists of, for example, circular thru-holes $3_1$, $3_2$, $3_4$, $3_5$, $3_6$, and $3_8$ corresponding to the pulse generation timing positions $T_{bl}$, $T_{b2}$, $T_{b4}$, $T_{b5}$, $T_{b6}$ and $T_{b8}$. That is, these rows are set so that at least one of the first thru-hole row 2 and the second thru-hole row 3 includes a thru-hole at the pulse generation timing position $T_{al}$ or $T_{bl}$, $T_{a2}$ or $T_{b2}$, $T_{a3}$ or $T_{b3}$, $T_{a4}$ or $T_{b4}$, $T_{a5}$ or $T_{b5}$, $T_{a6}$ or $T_{b6}$, $T_{a7}$ or $T_{b7}$, and $T_{a8}$ or $T_{b8}$.

As the key 1 is inserted into the key hole of the door with its normal state or right side up position shown in FIG. 5, the first light receiving elements 5 generates the first pulse train $P_a$ see FIG. 8(*b*)) encoded on the basis of the first thru-hole row 2, and the second light receiving element 7 generates the second pulse train $P_b$ (see FIG. 8(*c*)) encoded on the basis of the second thru-hole row 3.

The electric structure of the second embodiment will be described with reference to FIG. 7(*a*).

The first memory and comparator circuit 11 is normally selecting the first pre-set encoded signal, and provides a normal coincidence signal $S_{al}$ of a high level from its output terminal $O_a$ with the output signal of the first shift register 9 is equal to the first pre-set encoded signal. If a high level signal is given to a selection terminal S, however, the first memory and comparator circuit 11 selects the second pre-set encoded signal, and provides a reversal coincidence signal $S_{bl}$ of a high level from its output terminal $O_b$ when the output signal of the first shift register 9 is equal to the second pre-set encoded signal.

On the other hand, the second memory and comparator circuit 12 normally selects the second pre-set encoded signal, and provides a normal coincidence signal $S_{a2}$ of a high level from its output terminal $O_a$ when the output signal of the second shift register 10 is equal to the second pre-set encoded signal. If a high level signal is given to a selection terminal S, however, the second memory and comparator circuit 12 selects the first pre-set encoded signal and provides a reversal coincidence signal $S_{b2}$ of a high level from its output terminal $O_b$ when the output signal of the second shift register 10 is equal to the first pre-set encoded signal.

The output terminals $O_a$ of the first and second memory and comparator circuits 11 and 12 are connected to first and second input terminals of an AND circuit 14. The output terminals $O_b$ of the memory and comparator circuits 11 and 12 are connected to first and second input terminals of an AND circuit 15. In turn, the output terminals of the AND circuit 14 and 15 are connected to first and second input terminals of an OR circuit 16, respectively, and the output terminal of the OR circuit 16 is connected to a first input terminal of an AND circuit 17. A decision circuit 18, having a function described hereinafter, includes input terminals $I_a$ and $I_b$ respectively connected to the output terminals of the light receiving elements 5 and 7. An output terminal $0_a$ is connected to the selection terminals S of the first and memory and comparator circuits 11 and 12, and an output terminal $O_b$ is connected to a second input terminal of the AND circuit 17.

The operation of the second embodiment will be described with reference to FIGS. 8 and 9.

As the key 1 is inserted into the key hole of the door of the car in the normal (right side up) position shown in FIG. 5, the first light receiving element 5 generates the first encoded pulse train $P_a$ consisting of pulses $P_{al}$, $P_{a3}$, $P_{a4}$, $P_{a5}$, $P_{a7}$ and $P_{a8}$, as shown in FIG. 8(*b*), on the basis of the first thru-hole row 2 consisting of thru-holes $2_1$, $2_3$, $2_4$, $2_5$, $2_7$ and $2_8$, as shown in FIG. 8(*a*). At the same time, the second light receiving element 7 generates the second encoded pulse train $P_b$ consisting of pulses $P_{bl}$, $P_{b2}$, $P_{b4}$, $P_{b5}$, $P_{b6}$ and $P_{b8}$, as shown in FIG. 8(*c*), on the basis of the second thru-hole row 3 consisting of thru-holes $3_1$, $3_2$, $3_4$, $3_5$, $3_6$ and $3_8$, as shown in FIG. 8(*a*).

In the foregoing operation, the first and second pulse generation timings of the first pulse train $P_a$ and the second pulse train $P_b$ are displaced by one half of a pulse width, reflecting the pulse generation timing positions $T_{al}$, $T_{a2}$, . . . , $T_{a8}$ and $T_{b1}$, $T_{b2}$, . . . , $T_{b8}$, and either or both of the first and second pulse trains $P_a$ and $P_b$ cause the generation of a pulse at each combined pulse generation timing of the first and second timing systems. Accordingly, by applying these pulse trains $P_a$ and $P_b$ to the OR circuit 8, the OR circuit 8 generates the synchronizing signal consisting of (synchronizing pulses) $P_{cl}$, $P_{c2}$, . . . , $P_{c8}$ corresponding to the first and second pulse generation timings, as shown in FIG. 8(*d*), which is the logical add signal of these input pulse trains and is applied to the clock input terminals CK of the shift registers 9 and 10.

The first shift register 9 stores signals having values representing the presence or absence of a pulse in the pulse train $P_a$. Thus, in response to the inputs to the terminal I, the logical signal "1" or "0" is written into each of the storage positions of the shift register 9 on the basis of the synchronizing pulses $P_{cl}$, $P_{c2}$, . . . , $P_{c8}$. Similarly, the second shift register 10 stores signals having values representing the presence or absence of a pulse in the pulse train $P_b$. Thus, in response to inputs to the terminal I the logical signal "1" or "0" is written into each of the storage positions of the shift register 10 on the basis of the synchronizing pulses $P_{cl}$, $P_{c2}$, . . . , $P_{c8}$. Thus, the stored contents (read-out signal) of the first shift register 9 become an eight-bit signal "10111011", and the stored contents (read-out signal) of the second shift register 10 become an eight-bit signal "11011101".

As apparent from the foregoing description, when the key 1 is inserted into the key hole with the normal position shown in FIG. 5, the first light receiving element 5 outputs the first pulse $P_{al}$ on the basis of the thru-hole $2_1$ of the first thru-hole row 2. In response thereto, the decision circuit 18 judges that the key 1 is in the normal state, changes the output signal at its output terminal $0_a$ to a low level, and changes the output signal at its output terminal $O_b$ to a high level.

In response to the output signal at the output terminal $O_a$ of the decision circuit 18 being at a low level, the first memory and comparator circuit 11 selects the first pre-set encoded signal, whereas the second memory and comparator circuit 12 selects the second pre-set encoded signal. Each of the first and second memory and comparator circuits 11, 12 may be embodied as a multiplexer which is connected on input to a first shift register and a second shift register which store the first and second pre-set encoded signals, respectively. The multiplexer selects outputs to a comparator either the first pre-set encoded signal or the second pre-set encoded signal under the control of the selection signal $0_a$.

The output signals of the shift registers 9 and 10 are applied respectively to the input terminals I of the momory and comparator circuits 11 and 12. Thus, because the output signal of the first shift register 9 is in agreement with the first pre-set encoded signal (the eight-bit signal "10111011") the first memory and comparator circuit 11 outputs a normal coincidence signal $S_{al}$ from its output terminal $O_a$. Also, because the output signal of the second shift register 10 is in agreement with the second pre-set encoded signal (the eight-bit signal "11011101") the second memory and comparator circuit 12 outputs a normal coincidence signal $S_{a2}$ from its output terminal $0_a$.

These normal coincidence signals $S_{al}$ and $S_{a2}$ are applied to the AND circuit 14. In turn, the AND circuit 14 provides a high-level output signal, that is supplied to the first input terminal of the AND circuit 17 through the OR circuit 16. At this time, because the high-level output signal is applied from the output terminal $O_b$ of the decision circuit 18 to the second input terminal of the AND circuit 17, the AND circuit 17 outputs an unlock signal $S_c$ of a high level and applies the same to the door unlocking mechanism (not shown). This unlocking mechanism performs the unlocking action of the door by energizing a magnetic solenoid functioning as the actuator.

Thereafter, as the key 1 is removed from the key hole of the door, the second light receiving element 7 fitst outputs the pulse $P_{b8}$ on the basis of the thru-hole $3_8$ in the second thru-hole row 3. From this operation, the decision circuit 18 judges that the key 1 is in the normal position and being withdrawn from the key hole. This is because the second light receiving element 7 has provided the first pulse, i.e., $P_{b8}$. The decision circuit 18 changes the output signal at its output terminal $O_b$ to a low level. As a result, even if the memory and comparator circuits 11 and 12 would output the normal coincidence signals $S_{al}$ and $S_{a2}$ in response to the removal of the key 1, the AND circuit 17 is ineffective and does not output the unlock signal $S_c$ because the second input terminal of the AND circuit 17 is held at a low level.

Figure 6:
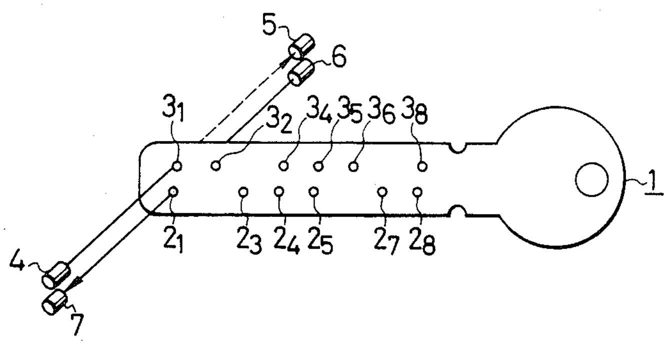

In case the key 1 is inserted upside down, from the position shown in FIG. 5 and assumes the orientation shown in FIG. 6, the first thru-hole row 2 becomes the lower row and the second thru-hole row 3 becomes the upper row. Accordingly, as the key 1 in the upside down position is inserted into the key hole of the door of the car, the second light receiving element 7 generates the first encoded pulse train $P_a$ consisting of the pulses $P_{al}$, $P_{a3}$, $P_{a4}$, $P_{a5}$, $P_{a7}$ and $P_{a8}$, as shown in FIG. 9(*c*), on the basis of the first thru-hole row 2 consisting of the thru-holes $2_1$, $2_3$, $2_4$, $2_5$, $2_7$ and $2_8$, as shown in FIG. 9(*a*).

At the same time, the first light receiving element 5 generates the second encoded pulse train $P_b$ consisting of the pulses $P_{bl}$, $P_{b2}$, $P_{b4}$, $P_{b5}$, $P_{b6}$ and $P_{b8}$, as shown in FIG. 9(*b*), on the basis of the second thru-hole row 3 consisting of the thru-holes $3_1$, $3_2$, $3_4$, $3_5$, $3_6$ and $3_8$, as shown in FIG. 9(*a*). These pulse trains $P_a$ and $P_b$ are applied to the OR circuit 8, which generates the synchronizing signal consisting of (synchronizing pulses) $P_{cl}$, $P_{c2}$, . . . , $P_{c8}$, as shown in FIG. 9(*d*). The synchronizing signal is the logical add signal of those pulse trains, similar to the case of the key 1 being in the normal position, and is applied to the respective clock input terminals CK of the shift registers 9 and 10.

The first shift register 9 stores signals having values representing the presence or absence of a pulse in the pulse train $P_b$. Thus, in response to the inputs to the terminal I, the logical signal "1" or "0" is written into each of the storage positions after shift register 9 on the basis of the synchronizing pulses $P_{cl}$, $P_{c2}$, . . . , $P_{c8}$. Similarly, the second shift register 10 stores signals having values representing the presence or absence of a pulse in the pulse train $P_a$. Thus, in response to inputs to the terminal I, the logical signal "1" or "0" is written into each of the storage positions of the shift register 10 on the basis of the synchronizing pulses $P_{cl}$, $P_{c2}$, . . . , $P_{c8}$. As a result, the output signal or the stored contents of the first shift register 9 become an eight-bit signal "11011101", and the output signal or the stored contents of the second shift register 10 become an eight-bit signal "10111011".

When the key 1 in the upside down position shown in FIG. 6 is inserted into the key hole, the second light receiving element 7 outputs the first pulse, $P_{al}$, on the basis of the thru-hole $2_1$ in the first thru-hole row 2. In response thereto the decision circuit 18 judges that the key 1 is the upside down state, changes the output signal at its output terminal $O_a$ to a high level, and changes the output signal at its output terminal $O_b$ to a high level as the result of the decision that the key 1 is being inserted.

In response to the output signal at the output terminal $O0_a$ of the decision circuit 18 being at a high level, the first memory and comparator circuit 11 selects the second pre-set encoded signal, whereas the second memory and comparator circuit 12 selects the first pre-set encoded signal. The output signals of the shift registers 9 and 10 are applied respectively to the input terminals I of the memory and comparator circuits 11 and 12. Thus, because the output signal of the first shift register 9 is in agreement with the second pre-set encoded signal or the eight-bit signal "11011101", the first memory and comparator circuit 11 outputs a reversal coincidence signal $S_{b1}$ from its output terminal $O_b$. Also, because of the output signal of the second shift register 10 is in agreement with the first pre-set encoded signal or the eight-bit signal "10111011", the second memory and comparator circuit 12 outputs a reversal coincidence signal $S_{b2}$ from its output terminal $O_b$.

These reversal coincidence signals $S_{b1}$ and $S_{b2}$ are applied to the AND circuit 15. The AND circuit 15 provides a high-level output signal that is supplied to the first input of the AND circuit 17 through the OR circuit 16. At this time, because the high-level signal is applied from the output terminal $O_b$ of the decision circuit 18 to the second input terminal of the AND circuit 17, the AND circuit 17 outputs the unlock signal $S_c$ of a high level and applies the same to the unlocking mechanism (not shown) of a car door. This unlocking mechanism performs the unlocking action of the door by energizing the magnetic solenoid functioning as the actuator.

Thereafter, as the key 1 is removed from the key hole of the door, at first, the first light receiving element 5 outputs the pulse $P_{b8}$ on the basis of the thru-hole $3_8$ in the second thru-hole row 3. The decision circuit 18 judges that the key 1 is upside down position and is being withdrawn from the key hole, because the first light receiving element 5 provides the pulse $P_{b8}$ at first. The decision circuit 18 changes the output signal at its output terminal $O_b$ to a low level. As a result, even if the memory and comparator circuits 11 and 12 would output the reversal coincidence signals $S_{b1}$ and $S_{b2}$ in response to removal of the key 1, the AND circuit 17 is ineffective and does not output the unlock signal $S_c$ because the second input terminal of the AND circuit 17 is held at a low level.

As apparent from the foregoing description, the second encoded pulse train $P_b$ is generated on the basis of the second thru-hole row 3 at the second pulse generation timing which is displaced a distance (extent) corresponding to the radius of the thru-hole (one half of the pulse width) with respect to the first encoded pulse train $P_a$ which is generated on the basis of the first thru-hole row 2 formed in the key 1 at the first pulse generation timing. In addition, the thru-hole rows are designed so that the first pulse train $P_a$ and the second pulse train $P_b$ include the first and last pulses $P_{a1}$ and $P_{a8}$ and the first and last pulses $P_{b1}$ and $P_{b8}$, respectively, without exception. Accordingly, whether the key 1 is in the normal position or in the upside down position can be discriminated at the time of insertion of the key 1 into the key hole by judging which of the first and the second light receiving element 5 and 7 first generated the pulse $P_{a1}$ on the basis of the thru-hole $2_1$ in the first thru-hole row 2.

A detailed description of the decision circuit 18 shown in FIG. 7(*a*) will be made with reference to FIGS. 7(*b*) -7(*e*).

Figure 7A:
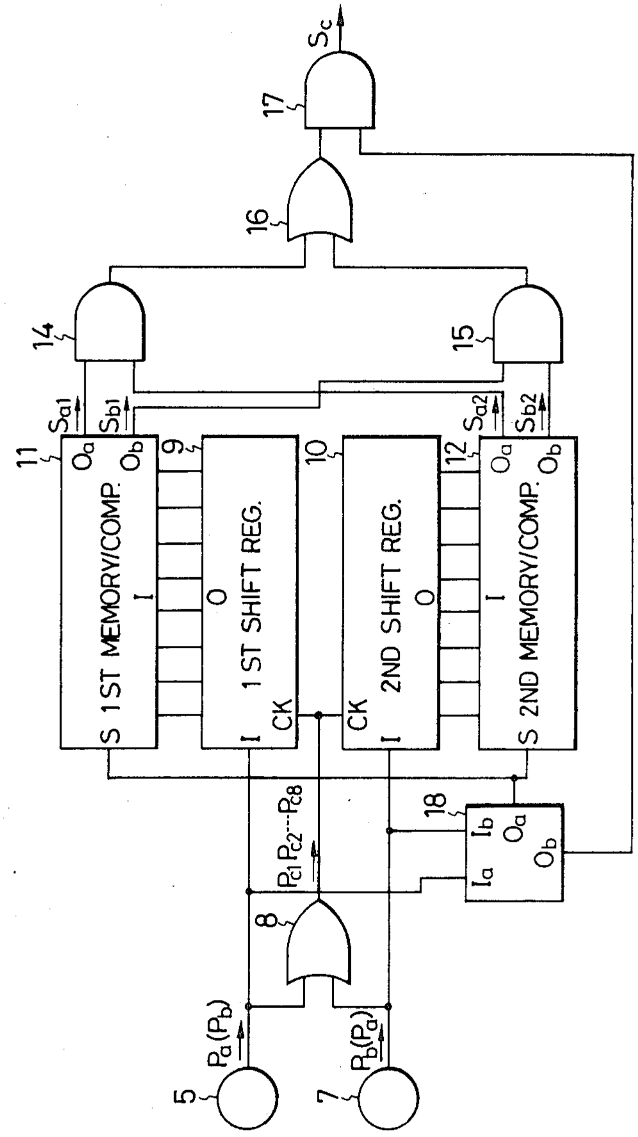
FIG. 7(*a*) is a block diagram of a processing circuit included in a second embodiment of the present invention.
Figure 7B:
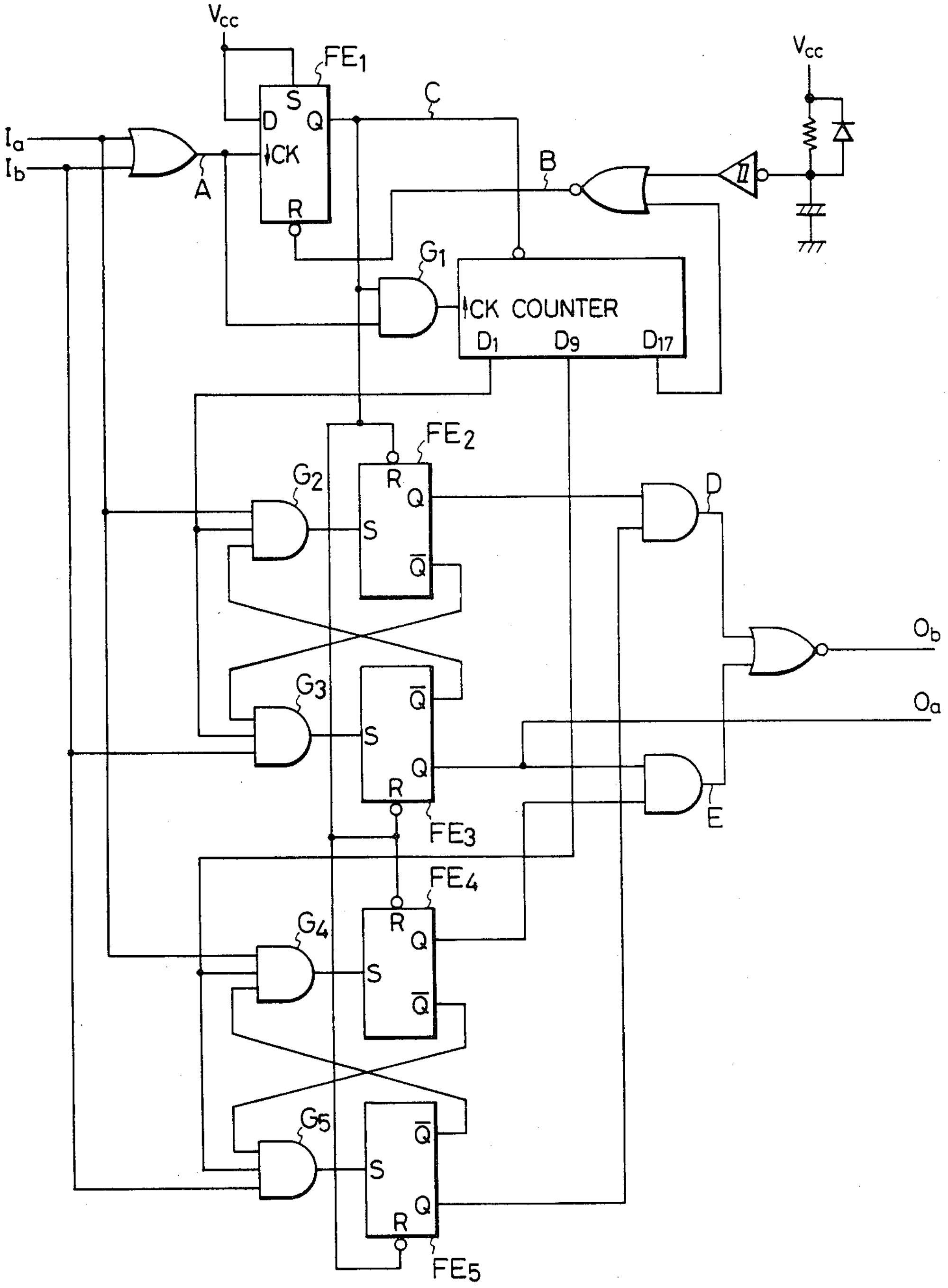
Figures 7C, 7D, 7E:
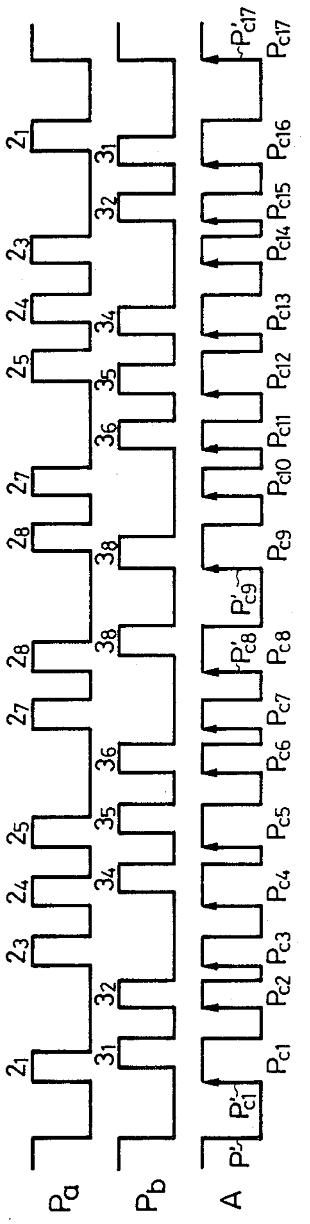

In FIG. 7(*b*), when a power supply $V_{cc}$ is ON, a flip-flop FF1 is reset in response to a signal B. A counter and the flip-flops FF2 through FF5 are reset in response to a signal C which is the Q output of the flip-flop FF1.

When the key is inserted, the flip-flop FF1 is set in response to a signal A and a gate G1 is enabled to allow the counter CT to start counting in response to a rising edge $P_{c1}'$, see FIG. 7(*e*)). When the output $D_1$ of the counter becomes "1," gates G2 and G3 are enabled. Precedence of the signals $P_a$ and $P_b$ is stored in either of the flip-flops FF2 and FF3. After the occurence of the pulse $P_{c1}'$, the states of the flip-flops FF2 and FF3 are maintained unchanged, and a normal upside down signal indicative of the inserting condition of the key is outputted from a terminal $O_a$. In this case, the Q output of the flip-flop FF3 is "0", and the Q output of the flip-flop FF2 is "1."

When the counter CT counts the pulse $P_{c9}$, the gates $G_4$ and $G_5$ are enabled, and one of the flip-flops FF4 and FF5 stores a signal which indicates which of $P_a$ and $P_b$ was received first. After the occurrence of the pulse $P_{c9}$, the states of the flip-flops FF4 and FF5 remain unchanged. In this case, the Q output of the flip-flop FF5 is "1" and the Q output of the FF4 is "0." As a result, the signal D is "1" and the signal E is "0". Accordingly, the signal $O_b$ is "0". This means that a key that had been inserted in the normal condition had been withdrawn. The AND gate 17 shown in FIG. 7 is thus disabled.

At the timing of $P_{c17}$, the flip-flop FF1 is reset and the circuit is pressed in an initial condition.

In the case of the key 1 being in the normal position, where the first light receiving element 5 generates the first pulse train $P_a$ and the second light receiving element 7 generates the second pulse train $P_b$, the decision circuit 18 causes the first memory and comparator circuit 11 to select the first pre-set encoded signal and the second memory and comparator circuit 12 to select the second pre-set encoded signal. On the contrary, in case the key 1 is in the upside down position where the first light receiving element 5 generates the second pulse train $P_b$ and the second light receiving element 7 generates the first pulse train $P_a$, the decision circuit 18 causes the first memory and comparator circuit 11 to select the second pre-set encoded signal and the second memory and comparator circuit 12 to select the first pre-set encoded signal. In this way, irrespective of whether the key 1 is inserted into the key hole in the normal position or the upside down position, the encoded signal is actually read out and the output signal or the unlock signal $S_c$ is actually generated.

Further, because the first pulse train $P_a$ and the second pulse train $P_b$ include the last pulses $P_{a8}$ and $P_{b8}$, respectively, without exception as described hereinabove, the withdrawal of the key 1 from the key hole can be discriminated from sensing which of the first light receiving element 5 and the second light receiving element 7 generated the pulse $P_{a8}$. In addition to the foregoing judgment relating to the normal or upside down position of the key 1, when it is determined that the key 1 is being withdrawn from the keyhole, the decision circuit 18 makes the AND circuit 17 ineffective. Accordingly, even if the coincidence signals $S_{a1}$ and $S_{a2}$ or $S_{b1}$ and $S_{b2}$ were generated from the memory and comparator circuits 11 and 12 at the time of removal of the key 1, an erroneous outputting of the unlock signal $S_c$ does not occur and the unlocking mechanism of the door cannot be actuated incorrectly.

Furthermore, because the synchronizing pulses $P_{c1}$, $P_{c2}$, . . . , $P_{c8}$ are created from the logical add signal of the first pulse train $P_a$ and the second pulse train $P_b$, a special thru-hole row for generation of the synchronizing signal is not necessary. This is advantageous in manufacturing the key 1. Also, the first light projecting element 4 and the second light projecting element 6 are opposite in light projecting direction, and the light receiving element 5 and 7 receive light only from the corresponding light projecting element 4 and 6, and the light receiving element 5 and 7 are not subject to a malfunction.

In modification, though in the first and second embodiments the first and second thru-hole rows 2 and 3 are formed in the key 1 as the first and second pulse generating means, in place, first and second magnetic generating portions may be provided, for example. Correspondingly, first and second Hall elements or reed switches may be provided as first and second detectors in place of the light projecting elements 4, 6 and light receiving elements 5, 7.

It should be noted that the present invention is not limited to the embodiments described hereinabove and illustrated in the drawings. The present invention can be applied to the whole technical field of electronic key devices, and may be subject to modifications and alternations within the scope of the appended claims.

I claim:

1. An encoded signal generating device comprising:

an operation member containing first and second rows of coded indicators containing n timing positions, said coded indicators being capable of assuming one of two mutually exclusive states and each of said rows of coded indicators being capable of representing $2^n$ possible values;

pulse generating means, cooperating with said coded indicators in said operation member, for generating first and second data trains of pulses from relative movement of said operation member and said pulse generating means, said first and second data trains corresponding to sid coded indicators in said first and second rows, respectively;

means for combining said first and second pulse data trains to produce a synchronizing signal comprising a plurality of pulses each approximately synchronized with a pulse of at least one of said first pulse data train and said second pulse data train; and means for storing said first and second pulse pulse data trains under the control of said synchronizing signal.

2. An encoded signal generating device according to claim 1, further including:

means for comparing said stored first and second pulse data trains to different ones of first and second preselected data trains, respectively, and for generating comparison outputs indicating whether said first pulse data train is equal to said first preselected data train and whether said second pulse data train is equal to said second preselected data train; and means responsive to said comparison outputs for generating an equal signal if said stored first pulse data train is equal to said first preselected data train and said stored second pulse data train is equal to said second preselected data train.

3. An encoded signal generating device according to claim 2, wherein said operation member comprises a key having a first row of longitudinally spaced apertures having positions corresponding to a first signal to be encoded and a second row of longitudinally spaced apertures having positions corresponding to a second signal to be encoded.

4. An encoded signal generating device according to claim 3, wherein said pulse generating means comprises:

a lock structure into which said key is moved;

a first light source on a first side of said lock structure to shine light on said key;

a first light detector, located on a side of said lock structure opposite said first side and aligned with said first light source so as to detect light from said first light service which passes through said apertures in said first row of apertures, for outputting said first pulse data train responsive to detection or nondetection of said light from said first light source during relative movement and said of said key with respect to said first light source and said first light detector;

a second light source located on a second side of said lock structure to shine light on said key; and a second light detector, located on a side of said lock structure opposite said second side and aligned with said second light source so as to detect light from said second light source which passes through said apertures in said second row of apertures, for outputting said second pulse data train responsive to detection or nondetection of said light from said second light source during relative movement of said key with respect to said second light source and said second light detector.

5. An encoded signal generating device according to claim 4, wherein said first and second sides of said lock structure are differenct such that said first light source and said second light source are located on opposite sides of said lock structure and said first light detector and said second light detctor are located on opposite sides of said lock structure.

6. An encoded signal generating device according to claim 4, wherein said combining means comprises an OR gate having a first input terminal for receiving said first pulse data train outputted by said first light detector, second input terminal for receiving said second pulse data train outputted by said second light detector, and an output terminal for outputting said synchronizing signal.

7. An encoded signal generating device according to claim 6, wherein said storing means comprises:

a first shift register having a first data input terminal connected to the output of said first light detector, a first data output, and a first clock input for receiving said synchronizing signal from said OR gate, the shifting of said first pulse data train into first shift register being controlled by said synchronizing signal received by said first clock input; and a second shift register having a second data input terminal connected to the output of said second light detector, a second data output and a second clock input for a receiving said synchronizing signal from said OR gate, the shifting of said second pulse data train into said second shift register being controlled by said synchronizing signal received by said second clock input.

8. An encoded signal generating device according to claim 7, wherein said comparing means comprises:

a first comparator, connected to said first output of said first shift register to receive said first pulse data train, for storing said first preselected data train, for comparing said first pulse data train and said first preselected data train, and for outputting a first comparison signal having a first value if said first pulse data train is equal to said first preselected data train and a second value if said first pulse data train is not equal to said first preselected data train; and a second comparator, connected to said second output of said second shift register to receive said second pulse data train, for storing said second preselected data train, for comparing said second pulse data train and said second preselected data train, and for outputting a second comparison signal having said first value if said second pulse data train is equal to said second preselected data train and said second value if said second pulse data train is not equal to said second preselected data train.

9. An encoded signal generating device according to claim 8, wherein said equal signal generating means comprises and AND gate having a first input terminal for receiving said first comparison signal, a second input terminal for receivng said first comparison signal, and an output terminal for outputting said equal signal if said first comparison signal and said second comparison signal each have said second value.

10. An encoded signal generating device comprising a key having a first row of longitudinally spaced apertures having positions corresponding to a first signal to be encoded and a second row of longitudinally spaced apertures having positions corresponding to a second signal to be encoded;

pulse generating means, cooperating with said key for generating first and second data trains of pulses from the relative movement of said apertures of said key and said pulse generating means, wherein said pulse generating means further includes a lock structure into which said key is inserted in a first direction and from which said key is extracted in a second direction;

a first light source on a first side of said lock structure to shine light on said key;

a first light detector, locatated on a side of said lock structure opposite said first side and aligned with said first light source so as to detect light from said first light source which passes through said apertures in said first row of apertures and for outputting said first pulse data train responsive to the detection or nondetection of said light passing from said first light source during relative movement of said key with respect to said first light source and said first light detector;

a second light source located on a second side of said lock structure to shine light on said key, and a second light detector, located on a side of said light structure opposite said second side and aligned with second light source so as to detect light from said second light source which passes through said apertures in said second row of apertures, and for outputting said second pulse data train responsive to detection or nondetection of said light passing from said second light source during relative movement of said key with respect to said second light source and said second light detector;

means for combining said first and second pulse data trains to produce a synchronizing signal comprising a plurality of pulses such that each pulse of said synchronizing signal corresponds in time approximately with a pulse of either said first pulse data train or said second pulse data train;

means for storing said first and second pulse data trains under the control of said synchronizing signal, said storing means including a first shift register having a first data input terminal connected to the output of said first light detector, a first data output, and a first clock input signal for receiving said synchronizing signal, the shifting of said first pulse data train into said first shift register being controlled by said synchronizing signal received at said first clock input, and a second shift register having a second data input terminal connected to the output of said second light source, a second data output, and a second clock input terminal for receiving said synchronizing signal, the shifting of said second pulse data train into said second shift register being controlled by said synchronizing signal received at said second clock input terminal;

means for comparing said first and second pulse data trains to different ones of first and second preselected data trains, respectively, and for generating comparison outputs indicating whether said first pulse data train is equal to said first preselected data train and whether said second pulse data train is equal to said second preselected data train;

means, responsive to said comparison outputs, for generating an equal signal if said stored first pulse data train is equal to said first preselected data train and said second stored pulse data trains is equal to said second preselected data train; and a decision circuit receiving said first pulse data train and second pulse data train for determining whether said key has been inserted into said lock structure in a normal orientation or in an inverted orientation and for determining whether said movement of said key relative to said pulse generating means is in said first direction or in said second direction, said decision circuit including a first output terminal for outputting a position signal having a first value if said key is in said normal position in said lock structure and for outputting a second value of said key is in said inverted position, and said decision circuit having a second output terminal for generating an inhibit signal having said first value if said relative movement of said key and said pulse generating means is in said first direction and having said second value if said relative movement of said key and said pulse generating means is in said second direction.

11. An encoded signal generating device according to claim 10, wherein said comparing means comprises:

a first comparator connected to said first output of said first shift register to receive said first pulse data train, for storing said first and second preselected data trains, for comparing said first pulse data train to said first preselected data train when said position signal has said first value and to said second preselected data train when said position signal has said second value, for outputting a first comparison signal having a first value if said first pulse data train is equal to said first preselected data train and a second value if said first pulse data train is not equal to said first preselected data train, and for outputting a second comparison signal having said first value if said first pulse data train is equal to said second preselected data train and a second value if said first pulse data train is not equal to said second preselected data train; and a second comparator connected to said first output of said second shift register to receive said second pulse data train, for storing said first and second preselected data trains, for comparing said second pulse data train to said second preselected data train when said position signal has said first value and to said first preselected data train when said position signal has said second value, for outputting a third comparison signal having a first value if said second pulse data train is equal to said second preselected data train and a second value if said second pulse train is not equal to said second preselected data train, and for outputting a fourth comparison signal having said first value if said second pulse data train is equal to said first preselected data train a second value if said second pulse data train is not equal to said first preselected data train.

12. An encoded signal generating device according to claim 11, wherein said generating means comprises:

a first output AND gate having a first input terminal for receiving said first comparison signal, a second input terminal for receiving said third comparison signal, and an output terminal for outputting a first equal signal having said first value if said first and third comparison signals each have said first value;

a second output AND gate having a first input terminal for receiving said second comparison signal, a second input terminal for receiving said fourth comparison signal, and an output terminal for outputting a second equal signal having said first value if said second comparison signal and said fourth comparison signal each have said first value; and an OR gate having a first input terminal for receiving said first equal signal, a second input terminal receiving said second equal signal, and an output terminal for outputting said equal signal.

13. An encoded signal generating device according to claim 12, further including means,'coupled to said second output terminal of said decison circuit, for inhibiting the transmission of said equal signal if the relative movement of said key and said pulse generatng means is in said second direction.

14. An encoded signal generating device according to claim 13, wherein said inhibiting means comprises an inhibit AND gate having a first input terminal for receiving said equal signal from said ouput terminal of said OR gate of said generating means, a second input terminal for receiving said inhibit signal from said second output terminal of said decision circuit, and an output terminal for outputting an output equal signal only when said equal signal received by said first input terminal of said inhibit AND gate and said inhibit signal received by said second input terminal of said inhibit AND gate each have said high value.

* * * * *

UNITED STATES PATENT AND TRADEMARK OFFICE
CERTIFICATE OF CORRECTION

PATENT NO. : 4,691,201

DATED : September 1, 1987

INVENTOR(S) : Sadao Kokubu

It is certified that error appears in the above-identified patent and that said Letters Patent is hereby corrected as shown below:

Claim 1, Column 11, line 56, "sid" should be --said--

Claim 10, Column 13, line 57, "locatated" should be --located--.

Signed and Sealed this

Twelfth Day of January, 1988

Attest:

DONALD J. QUIGG

*Attesting Officer*

*Commissioner of Patents and Trademarks*